United States Patent Office

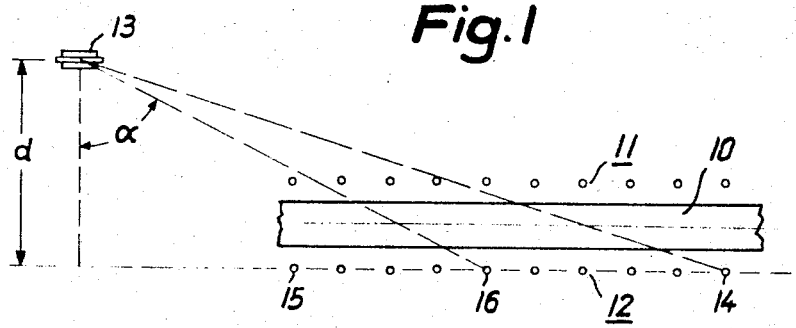
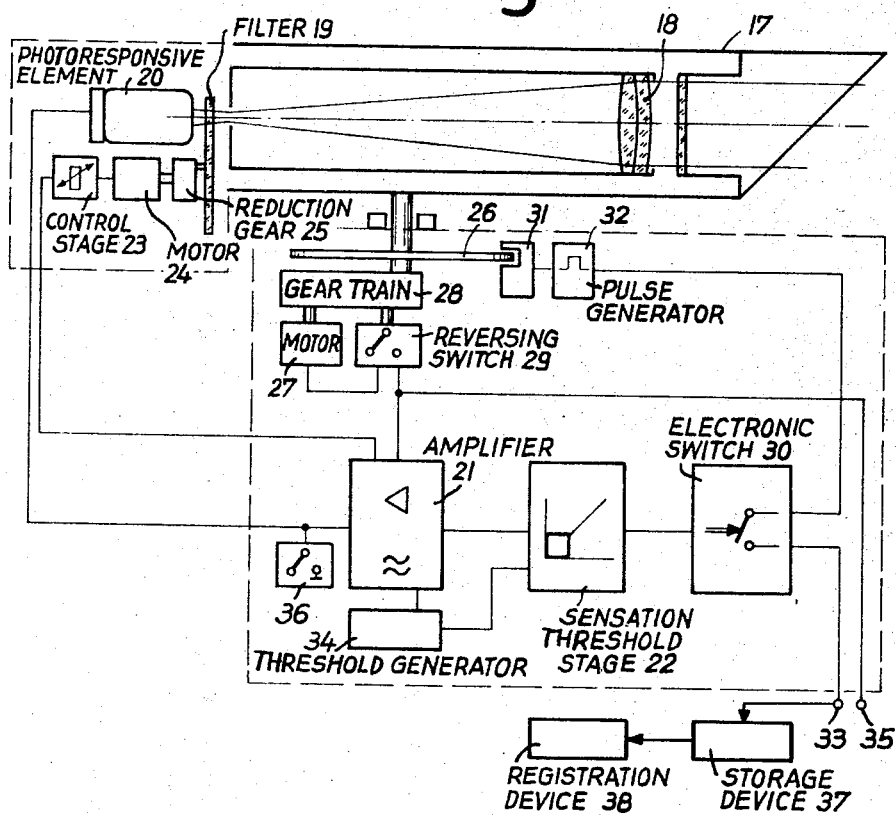

3,348,059
Patented Oct. 17, 1967

3,348,059
VISIBILITY TESTER WITH COMPENSATION FOR THE THRESHOLD LEVEL OF THE HUMAN EYE
Rolf Schellhase and Gerhard-Helferich Ruppersberg, Munich, Germany, assignors to Licentia Patent-Verwaltungs G.m.b.H., Frankfurt am Main, Germany
Filed Apr. 6, 1965, Ser. No. 446,037
Claims priority, application Germany, Apr. 7, 1964, L 47,510, L 47,511
13 Claims. (Cl. 250—229)

The present invention relates to a method and apparatus for determining visibility, and, more particularly, to a method and apparatus for measuring the visibility with respect to given objects, which objects may be luminous or non-luminous. The terms luminous and non-luminous are used herein to distinguish between those objects which include some source of light and those which do not, irrespective of the type of light source. The measurement of visibility afforded by the present invention is a necessary item of information for instance at places where meteorological data are required for safety or for determining the feasibility of communication.

Visibility measuring devices are already known which measure the so-called normal, or standard, visibility, or the entropy of an overcast atmosphere, from which the visibility may be determined under certain conditions.

The visibility of objects, whether they are luminous or non-luminous, may depend on several factors other than their normal visibility, such as the spatial arrangement of the objects, the light conditions present, and the particular human eye making the observation. The visibility may be determined from various tables, such as Bulletin DIN 5037, if all the necessary parameters are known (DIN are the German industrial standards).

The method described, however, is too complicated for normal use, so that visibility is often determined from day to day by estimation, or in some instances merely the normal visibility may be determined. These estimations are partly based on experience and rules of thumb and are made by human beings, so that they are partially dependent on the eye of the observer and the variation in experience among observers.

The determination of visibility at airports is extremely important. The presence of runway illuminators, comprising chains of individual lamps running along the runway, aids the determination of visibility, since such lamps may serve as auxiliary objects for measuring the visibility. The visibility may, for example, be measured by counting the number of lights visible in such a chain at any given time, which number is an indication of the visibility at that time. A determination of visibility is sometimes made by a human observer, or may be made by a device designed for that purpose. However, if such devices are used, it is not sufficient to merely count the number of visible lamps, since the existence of the threshold of sensation of the human eye must be taken into account. The sensation threshold of the human eye, or that level of illumination at which the eye can first see an object, may be accounted for by utilizing a telephotometer to measure, with respect to a point of observation, the intensity of illumination produced by the object and, simultaneously, the light intensity of the background about the object. The ratio of the amounts of light reaching the observation point from these two places may be used to account for the threshold of the human eye, in determining the visibility. As a row of light sources is scanned, the luminous intensity from the light sources may be distinguished from that of the background since the former appears as a sequence of pulses, while the latter is registered as a direct current, which varies at a much slower rate, the difference in amplitude between the pulses and the direct current providing a measure of the luminous intensity differential between the light sources and the background.

The magnitudes of the two signals may vary by several orders of magnitude; however, their quotient varies much more slowly. With a suitable optical system, light sources of any kind may be scanned and the light from the optical system allowed to fall on a photoelectric cell, so that the cell output current includes a component due to the at most slowly varying background light, in the form of a D.C. level, and a component due to the light sources, which appears as a series of pulses. It should be mentioned at this point that with the method referred to above, the measurement of visibility may be substantially adversely affected by the failure of one or more of the lamps used as auxiliary objects.

It is therefore an object of the present invention to provide a method and apparatus for determining visibility which overcomes the disadvantages found in the prior art.

It is a further object of the present invention to provide a method and apparatus for determining visibility wherein the inherent sensitivity threshold of the human eye is accounted for.

It is a further object of the present invention to provide a method for measuring visibility by determining the angle corresponding to the most distant one of a series of auxiliary objects which is visible.

It is furthermore an object of the present invention to provide a device for determining visibility which functions under conditions of both high and low background light.

These objects as well as others are achieved according to the invention, wherein a telephotometer is provided for automatically scanning a series of auxiliary objects to indicate the furthest one visible, taking into account the sensitivity threshold of the human eye by registering light only from those auxiliary objects having an apparent light intensity greater than a certain threshold value determined by the ratio of the light from the auxiliary objects to the background light level.

Additional objects and advantages of the present invention will become apparent upon consideration of the following description when taken in conjunction with the accompanying drawings in which:

FIGURE 1 is a schematic plan view illustrating measurement of visibility by means of a chain of airport runway lights.

FIGURE 2 is a schematic block diagram showing a control device coupled to a telephotometer for measuring visibility.

Referring now to the drawings, FIGURE 1 shows a runway 10 along with two rows of runway lights 11 and 12 parallel to either side of the runway. A rotatably mounted telephotometer 13 is provided a safe distance from, and above, the runway. In the example of a measurement described, the chain of lamps 12 is used to determine visibility. Since the distance $d$, measured at right angles to row 12, between the telephotometer 13 and the light chain 12 is known, the distance between the telephotometer and any one of the lamps in the chain may be determined from the angular direction $\alpha$ of the lamp. If the telephotometer is rotated, starting from the farthest lamp 14 of the chain 12, in the direction of the other lamps in the chain, the telephotometer will register one of these lamps—for example lamp 16—as the first visible lamp. The angle $\alpha$, which may now be measured, corresponds to the distance of this lamp from the observation point. The accuracy of the measurement depends on the distance between the individual lamps. By designing the telephotometer 13 to be highly directional—that is, so that its optical system provides an extremely narrow field—and by elevating the telephotometer with respect to the lamps, the possibility of registering lamps in chain 11, and thus obtaining a false measurement, is eliminated. The angle α thus measured, indicating the distance corresponding to the instantaneous visibility, may be used in any further arbitrary way.

The auxiliary objects used in the measurement may be either luminous or non-luminous. Non-luminous objects such as a row of dark poles, may be registered by a telephotometer since they present a contrast to brighter surroundings. Luminous objects may be lamps, which are detectable by the telephotometer since they have greater intensity of illumination than the surrounding field. The telephotometer used for dark objects must have a correspondingly greater directivity, or narrowness of field of the optic.

As has been mentioned previously, visibility may be determined by means of an automatic mechanism, rather than by a human operator. According to the present invention, an automatic control device is coupled with a telephotometer for automatically carrying out the measurement procedure described above. The automatic control device includes a threshold limiter for duplicating the sensation threshold of the human eye, and includes an element, the light transmittance of which is variable, through which both the alternating and D.C. components of the light beam pass, and which is placed in front of the photoelectric element. The control device adjusts the light transmittance of this element in accordance with the instantaneous value of the D.C. component, while it blocks the alternating light component until it exceeds a magnitude corresponding to that of the threshold of the human eye. A result sufficiently close to that demonstrated by the adaptation mechanism of the eye is obtained if in the lower operating range of the instrument, which corresponds to a low level background light, the magnitude which corresponds to the sensation threshold of the eye, and which determines the value which the alternating component must have before it is sensed, and the magnitude of the D.C. component, are reduced. This, however, causes the quotient of the magnitude divided by the D.C. component to increase because the D.C. component varies more rapidly than the magnitude.

If, for example, the ambient or background luminous intensity is reduced from $10^4$ c.d./m.$^2$ to 10 c.d./m.$^2$, the quotient of the two light beams, which corresponds to the threshold of the human eye, changes only by a factor of 3. At lower values of the background luminous intensity, this quotient rises more steeply. A good approximately of this quotient is obtained in the upper operating range by a quotient of constant value and, in the lower operating range, by a quotient whose value increases gradually. This works especially well if the constant value which approximates the quotient is set relatively low. This system works equally as well for non-luminous as for luminous objects.

In the lower range of operation of the apparatus, the value of the quotient for controlling the alternating light component is proportional to the square root of the D.C. light component. In this range, it is advantageous to obtain such value by rectifying the noise current produced by the photoelectric cell.

As shown in FIGURE 2, a telescope 17 is provided with an optical system 18, through which the alternating light component and the D.C. light component are directed upon a photoelectric cell 20 through a variable transmittance filter 19. As previously mentioned, the D.C. component corresponds to the background luminous intensity, and changes only slowly. The alternating component of the photocell output corresponds to the luminous intensity impulses produced as the light from the visible or nearly visible runway lamps, as they are scanned, impinges on cell 20, and the amplitude of the A.C. component is proportional to the light intensity of each lamp as seen at the location of the apparatus. The runway lamps need not be flashing; each lamp will apply an input pulse to cell 20 as the lamp passes through the field of view of optical system 18.

The output current of the photoelectric receiver 20 has three components; a direct current component that corresponds to the background luminous intensity; an alternating current produced by the pulses from the visible or nearly visible lamps; and a third component which corresponds to the noise current of the photocell, and which is substantially proportional to the square root of the D.C. component.

These three components are applied to the amplifier 21, which performs the following functions:

All the input-signals are amplified. Furthermore, the amplifier 21 works as a part of a control mechanism including the filter 19, a control stage 23, a motor 24 and a reduction gear 25. Filter 19 has a variable transmittance in that its transparency varies in a tangential, or angular, direction. Therefore, as filter 19 is rotated, the percentage of incident light which it passes to cell 20 varies. This control mechanism maintains the direct current component constant in correspondence with the behavior of the human eye in the high range of luminous background intensity. This is accomplished by rotating filter 19 in a direction determined by variations in the direct current component and by an amout such that the transparency of the portion of filter 19 in front of cell 20 varies inversely with variations in luminous background intensity. As a result, the direct current component of the output from cell 20 is maintained constant over the high range. However, the same operation is not carried out for the lower background intensity range, i.e. with increasing darkness. The amplifier 21 then as its third function, automatically starts the threshold generator 34 at the moment when the direct current component becomes so low that it becomes impossible to maintain the direct current component constant by means of the control mechanism, and particularly by further rotation of filter 19.

Because of the already described proportionality between the direct current component and the noise current of the photo cell it now becomes possible to employ the noise current for controlling the threshold generator 34 via the amplifier 21.

A succeeding sensation threshold stage 22 suppresses all signals which are smaller than the threshold voltage, which is generated by threshold generator 34 by rectifying the noise current of the photoelectric pick-up.

During daylight, when the background luminous intensity is relatively high, the apparatus is operated in a high control range. The control mechanism, which includes the filter 19, a control stage 23, a motor 24 and a reduction gear 25, maintains the average output current from the photoelectric cell constant. In this range then, the threshold voltage is also constant. The alternating voltage component can then exceed the threshold voltage only when the apparatus is directed at one of the lamps, at which point the quotient exceeds the constant preset threshold value.

In the lower control range, the filter 19 can no longer provide adequate compensation. As the value of the background luminous intensity is the denominator of the quotient, a decrease in this intensity causes the instantaneous threshold value to rise; however, the steepness of the rise is attenuated since it occurs at a rate proportional to the square root of the luminous intensity.

The resulting voltage characteristic, over both the high and low control ranges, thus represents a good approximation of the perception behavior of the human eye.

To measure visibility at an airport, as previously described, the horizontal angle of the telescope 17 with respect to the row of runway lights serves as an indication of the visibility, when the apparatus is directed at the last visible runway lamp. This angle may be measured by a disc marked or perforated according to a digital code, which disc is coupled to the apparatus so as to rotate along with it. The whole apparatus, including the disc, is rotated by a motor 27, which drives the telescope 17 by means of a gear train 28. The direction of rotation may be reversed by reversing switch 29. If, during a scan of the runway, the alternating voltage component generated by the first visible lamp exceeds the threshold voltage of the threshold stage 22, the output from this stage momentarily closes an electronic switch 30. An angle scanning device 31 is provided adjacent the perforated disc 26, which device 31 reads the digitally coded perforations on disc 26 and actuates a pulse generator 32 to provide an indication of the angle along which the device is pointing. Thus, when the switch 30 is closed, the pulses produced by pulse generator 32 pass through switch 30 to output terminal 33, where they may be fed to a registration device. The number of transmitted impulses is then a measure of the distance of the first visible lamp, and thus is also a measure of the visibility.

The apparatus is coupled via terminal 33 to a registration device. Terminal 35 also serves as an input for synchronisation through which control signals may be provided, such as "start," "stop," or "reset" signals. An electronic switch 36 may be provided for eliminating possible interfering signals, such as lighting, which may easily be distinguished from the pulses being scanned due to their different pulse width.

It has been mentioned that the measurement apparatus according to the present invention should be located so as not to interfere with standary airport building restrictions. Thus, the telephotometer may be positioned about 500 meters from the beginning of the runway, at a height of about 6 meters above ground level, and approximately 80 meters from the center line of the runway.

While the invention has been described in relation to visibility measurement at airports, it may also be applied, for example, to provide a fog warning for marine navigation. A flashing buoy, for instance, could be positioned at some critical distance from the device, and could be kept constantly in the field of the telescope 17. When the visibility become so poor that the pulses from the buoy were lower than the threshold set in the threshold device 22, a warning signal could be generated.

As has been shown, in one embodiment of the invention, an electrical pulse is generated corresponding to each visible auxiliary object as the telephotometer rotates to scan each of the objects. These pulses are blocked, so that they have no effect, until the apparatus has registered the farthest visible object, at which time the number of electrical pulses generated serve as a measure of the angle registered by the instrument. An electric or electronic switch controlled by a signal from the telephotometer may be used to prevent all pulses from becoming effective until such signal is received.

According to a further embodiment of the invention, a storage device 37 may be provided for storing the pulses generated by the instrument, which pulses occur irregularly with respect to time during the scanning process. This electrical or electronic storage device may subsequently feed all of the stored pulses to a further device, preferably during a pause in the measuring process. Readout from the storage device may be in a regular sequence and the pulses may be reshaped so that they have the proper width for actuating the further device. The irregularity of the pulse sequence from each measuring process is due to the non-linearity of the angular function which is directly measured by the instrument. Such a storage step is especially advantageous if further use is to be made of the angle measured, for example, by a registration device 38 coupled to the output of the storage means.

It will be understood that the above description of the present invention is susceptible to various modifications, changes, and adaptations, and the same are intended to be comprehended within the meaning and range of equivalents of the appended claims.

What is claimed is:

1. In an apparatus for measuring the visibility of luminous or non-luminous auxiliary objects, including a telephotometer for scanning a chain of such objects extending substantially in a line, and for measuring, with respect to its own location, the intensity of the illumination produced by each auxiliary object, as well as the background luminous intensity in the vicinity of such objects, so as to provide a measure of visibility which accounts for the inherent sensation threshold of the human eye: comparison means coupled to said telephotometer for comparing the measured illumination intensity of each such object with a threshold value which varies as a function of the background luminous intensity, which function approximates the sensation threshold of the human eye; and means coupled to said comparison means for measuring the angle, with respect to a fixed reference, corresponding to the most distant of such auxiliary objects from the telephotometer whose measured illumination intensity exceeds the threshold value existing at the corresponding measured background illumination intensity.

2. Apparatus as defined in claim 1, including means for causing said telephotometer to scan such auxiliary objects beginning with the most distant of such objects.

3. Apparatus as defined in claim 1, including means coupled to said angle measuring means for generating pulses as said telephotometer reaches predetermined angles during said scan; and means for blocking all of the pulses so generated until the apparatus registers the most distant auxiliary object still visible, so that the pulses generated when the latter auxiliary object is reached serve as a measure of the angle associated with that object, and thus of the visibility.

4. Apparatus as defined in claim 3, including storage means for storing all of the pulses generated by said pulse generating means, which pulses occur in an irregular sequence during the scanning process, and for making said pulses available at a constant rate and with a suitable bandwidth during an interval in the measuring process.

5. In an apparatus for measuring the visibility of luminous or non-luminous auxiliary objects, including a telephotometer for scanning a chain of such objects extending substantially in a line, and for measuring, with respect to its own location, the intensity of the illumination produced by each auxiliary object as well as the background luminous intensity of the vicinity of such objects, and separating such illumination from such background luminous intensity by virtue of the difference in their frequency characteristics, so as to provide a measure of visibility which accounts for the inherent sensation threshold of the human eye: comparison means coupled to said telephotometer for comparing the measured illumination intensity of each such object with a threshold value which varies as a function of the background luminous intensity, which function approximates the sensation threshold of the human eye; and means coupled to said comparison means for measuring the angle, with respect to a fixed reference, corresponding to the most distant of such auxiliary objects from the telephotometer whose measured illumination intensity exceeds the threshold value existing at the corresponding measured background illumination intensity.

6. Apparatus for measuring the visibility of luminous or non-luminous auxiliary objects, and apparatus comprising, in combination: telephotometer means for scanning a chain of such auxiliary objects extending substantially in a line and for deriving signals indicative of the intensity, with respect to its own location, of the illumination produced by each auxiliary object as well as the background luminous intensity in the vicinity of such objects; means for distinguishing such signals on the basis of their frequency characteristics, so as to provide a measure of visibility which accounts for the inherent sensation threshold of the human eye; means coupled to said telephotometer for comparing the measured illumination intensity of each such object with a threshold value which varies as a function of the background luminous intensity, which function approximates the sensation threshold of the human eye; and means coupled to said comparison means for measuring the angle, with respect to a fixed reference, corresponding to the most distant of such auxiliary objects from the telephotometer whose measured illumination intensity exceeds the threshold value existing at the corresponding measured background illumination intensity.

7. Apparatus for measuring the visibility of luminous or non-luminous auxiliary objects, said apparatus comprising, in combination:

telephotometer means for scanning a chain of such auxiliary objects extending substantially in a line and for measuring, with respect to its own location, the intensity of the illumination produced by each auxiliary object as well as the background luminous intensity in the vicinity of such objects, said telephotometer means including photoelectric cell means for producing during said scanning, a first alternating signal in response to an alternating luminous intensity emitted by said auxiliary objects, and a second signal which is substantially constant with respect to the first signal and at most slowly changing, said second signal being in response to said background luminous intensity, both said first and second intensities varying over ranges of several orders of magnitude;

variable light transmittance means in front of said photoelectric receiver in the path of said first and second intensities;

control means responsive to said photoelectric cell means for adjusting the transmittance of said variable light transmittance means in accordance with the instantaneous value of the second signal for passing only those portions of the first intensity which exceed a predetermined intensity magnitude corresponding to the sensation threshold of the human eye; and means coupled to said telephotometer for measuring the angle, with respect to a fixed reference, corresponding to the most distant of said auxiliary objects from the telephotometer which the latter registers as visible, taking into account the sensitivity threshold of the human eye.

8. A device for determining the quotient of the value of a first luminous intensity which is an alternating luminous intensity and a second luminous intensity which is substantially constant with respect to the first intensity, and at most slowly changing, both of the intensities varying over ranges of several orders of magnitude, said device comprising, in combination: photoelectric cell means responsive to said first and second luminous intensities; variable light transmittance means in front of said photoelectric cell means in the path of said first and second intensities; and control means responsive to said photoelectric cell means for adjusting the transmittance of said variable light transmittance means in accordance with the instantaneous value of the second luminous intensity for passing only those portions of the first intensity which exceed a predetermined intensity magnitude corresponding to the sensation threshold of the human eye.

9. A device as defined in claim 8, said device being operable in an upper operating range and a lower operating range, wherein in said lower operating range, both said predetermined magnitude corresponding to the sensation threshold of the human eye, and the magnitude of said second intensity are reduced, whereby the value of the quotient of the two magnitudes rises.

10. A device as defined in claim 9, wherein in said lower operating range, said predetermined magnitude for controlling the passage of the alternating intensity is proportional to the square root of the second intensity.

11. A device as defined in claim 10, wherein said control means includes means for rectifying the noise current of the photoelectric pick-up to provide said predetermined magnitude for controlling the first intensity component.

12. A method of determining visibility, comprising the steps of:

scanning a series of auxiliary objects placed at increasing distances from an observation point;

measuring, at such observation point and during scanning, the luminous intensity from such objects and the background luminous intensity;

comparing the measured luminous intensity of each object with a threshold value which varies as a function of the background luminous intensity substantially in accordance with the sensation threshold of the human eye; and measuring the angle with respect to a fixed reference, of the furthest of such auxiliary objects whose luminous intensity at such observation point exceeds the intensity represented by such threshold value at the existing background luminous intensity level, said angle being an indication of the visibility.

13. A method as defined in claim 12, wherein said auxiliary objects are scanned beginning with the most distant of said objects.

References Cited

UNITED STATES PATENTS 2,133,241 10/1938 Baker.
3,144,562 8/1964 Orthuber et al. _____ 250—203
3,204,218 8/1965 Fillery.

RALPH G. NILSON, *Primary Examiner.*

M. ABRAMSON, *Assistant Examiner.*